United States Patent
Shiraishi et al.

(10) Patent No.: US 8,690,407 B2
(45) Date of Patent: Apr. 8, 2014

(54) ILLUMINATION UNIT AND DISPLAY APPARATUS USING THE SAME

(75) Inventors: Mikio Shiraishi, Yokohama (JP); Masayuki Tanabe, Fujisawa (JP); Mika Tanimura, Yokohama (JP); Shoji Yamamoto, Fujisawa (JP); Kenji Takano, Nagaoka (JP); Yoshifumi Shimane, Machida (JP); Yasuaki Ohara, Yokohama (JP); Reiji Nakamura, Ichinomiya (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 45 days.

(21) Appl. No.: 13/567,662

(22) Filed: Aug. 6, 2012

(65) Prior Publication Data
US 2013/0051065 A1 Feb. 28, 2013

(30) Foreign Application Priority Data
Aug. 26, 2011 (JP) ................... 2011-184271

(51) Int. Cl.
*F21V 7/04* (2006.01)

(52) U.S. Cl.
USPC ........... 362/602; 362/612; 362/613; 362/617; 349/61; 349/63

(58) Field of Classification Search
USPC ........... 362/602, 612, 613, 617, 558, 606, 18, 362/619, 620; 349/61–64
See application file for complete search history.

(56) References Cited

U.S. PATENT DOCUMENTS

| | | | |
|---|---|---|---|
| 7,139,048 B2 * | 11/2006 | Han et al. | 349/62 |
| 7,204,632 B2 * | 4/2007 | Chen | 362/613 |
| 7,357,552 B2 * | 4/2008 | Takada | 362/608 |
| 7,468,710 B2 * | 12/2008 | Nakaoka | 345/32 |
| 8,317,386 B2 * | 11/2012 | Nagata et al. | 362/611 |
| 2006/0215386 A1 | 9/2006 | Hatanaka et al. | |
| 2011/0051412 A1 | 3/2011 | Jeong et al. | |
| 2011/0170020 A1 | 7/2011 | Kasai | |
| 2012/0026753 A1 | 2/2012 | Shiraishi et al. | |

FOREIGN PATENT DOCUMENTS

| | | |
|---|---|---|
| EP | 2 416 058 A1 | 2/2012 |
| JP | 2003-242817 | 8/2003 |
| JP | 2005-117023 A | 4/2005 |
| JP | 2005-005067 A | 6/2005 |
| JP | 2012-033420 A | 2/2012 |
| WO | WO 2010/041499 A1 | 4/2010 |
| WO | WO 2010/131505 A1 | 11/2010 |

OTHER PUBLICATIONS

European Patent Office extended search report on application 12179252.7 mailed Nov. 21, 2012; 5 pages.

* cited by examiner

*Primary Examiner* — Ali Alavi
(74) *Attorney, Agent, or Firm* — Foley & Lardner LLP

(57) ABSTRACT

An illumination unit includes an LED and a tabular light guide plate having a light emitting surface for emitting light from the LED as planar light, wherein a recessed portion is formed in the opposite surface of the tight emitting surface of the light guide plate, and wherein the LED is provided in the recessed portion so that the optical axis of the LED becomes parallel to the light emitting surface of the light guide plate. Further, a plurality of LEDs are arranged along the longer direction of the recessed portion, a dimming pattern is provided at a location corresponding to each of a plurality of LED of the light emitting surface of the light guide plate, and the shape or the size of the dimming pattern is varied with a location on the light emitting surface of the light guide plate.

10 Claims, 14 Drawing Sheets

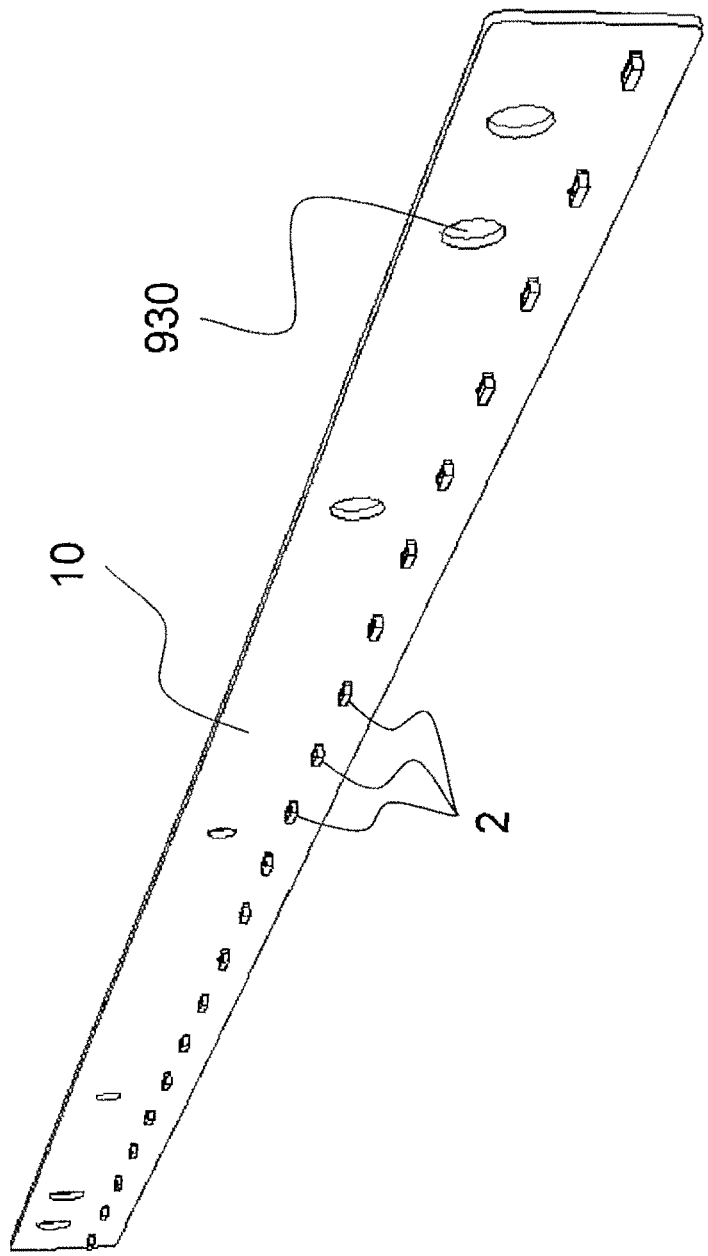

ILLUMINATION UNIT AND DISPLAY APPARATUS USING THE SAME

INCORPORATION BY REFERENCE

The present application claims priority from Japanese application JP2011-184271 filed on Aug. 26, 2011, the content of which is hereby incorporated by reference into this application. The contents of Japanese applications JP2011-184273 filed on Aug. 26, 2011 and JP2011-184274 filed on Aug. 26, 2011 are also hereby incorporated by reference into this application.

BACKGROUND OF THE INVENTION

The present invention relates to an illumination unit using LEDs (Light Emitting Diodes) as a light source, and to a display apparatus using the same as a back light.

The illumination unit using an LED, i.e., a light emitting element, as a light source is used as a back light of a display apparatus with a transmission type display device, such as a liquid crystal display panel (LCD), and is widely put into practical use.

As the configuration of the illumination unit used as a back light, a configuration using an LED as a light source and a light guide plate for guiding the light emitted from the LED to an LCD side as a surface light source is known.

In such configuration, the light incoming from the light source travels inside the light guide plate by total internal reflection or the like, and is scattered by a diffusion/light guide pattern provided on the surface of the light guide plate, and is extracted from the surface of the light guide plate. At this time, in the vicinity of the light source (the vicinity of the light incident portion) of the light guide plate, the intensity of light locally increases as compared with other portions and the so-called uneven brightness is generated. As a conventional art for reducing such uneven brightness, it is known that a light shielding member or a light reflective/absorbing member is provided in the vicinity of a light source of the surface of a light guide plate, as described, for example, in JP-A-2005-117023 and JP-A-2003-242817.

Moreover, with regard to a difference in brightness between the end and the center of a light guide plate caused by neighboring reflections, it is known that as described, for example, in JP-A-2005-5067, a light guide pattern is varied between the end and the center of the light guide plate to suppress the uneven brightness.

Furthermore, with regard to the uneven brightness generated in the vicinity of a light source (the vicinity of a light incident portion) of a light guide plate as described, for example, in WO2010041499, an example and the like are known, in which the uneven brightness is reduced as a layered structure, wherein a light guide plate is split into a plurality of stages and portions in the vicinity of a light source of each light guide plate are diagonally overlapped.

SUMMARY OF THE INVENTION

In the display apparatus of a recent television apparatus or the like, there is a need for increasing the screen size, and furthermore saving power consumption and increasing picture quality. In order to realize the power-saving and high quality picture in the display apparatus with a large screen, the so-called areal control (local dimming) is carried out, wherein the entire screen of the display apparatus is divided and furthermore the irradiation surface of an illumination unit is divided into a plurality of regions corresponding to the divided screens, and wherein the light intensity of each region of the illumination unit is individually controlled corresponding to an image of the divided screen. Here, the region is the minimum unit for controlling light and is virtual, and thus does not need to be physically divided.

In cases where a light guide plate split for each region is used in order to carry out areal control, if all the light emitting directions of an LED of each region are the same (e.g., from bottom to top of a screen), then the uppermost region (the region located ahead in the light emitting direction of the LED) becomes relatively bright because the uppermost region is supplied with light from a plurality of regions on the preceding stages. However, the lowermost region (the region at the point of origin of the light emitting direction of the LED) being the first stage has no region on the preceding stage and therefore cannot receive light and thus becomes relatively dark as compared with the regions thereabove. Similarly, if the light emitting directions of an LED of each region is, for example, from top to bottom of the LED, then the lowermost region (the region located ahead in the light emitting direction of the LED) becomes relatively bright. However, the uppermost region (the region at the point of origin of the light emitting direction of the LED) becomes relatively dark as compared with the regions thereunder. The same applies to the case where the light emitting direction of the LED is horizontal, and when the light emitting direction of the LED is from one end in the horizontal direction of a screen to the other end, a region in the vicinity of one end becomes relatively dark and a region in the vicinity of the other end becomes relatively bright.

Moreover, when the light emitting direction of an LED of each region is for example, from top to bottom of the LED, a region located in the center in the horizontal direction of a screen becomes bright because it is supplied with light due to the leakage of light from the both regions laterally adjacent thereto. However, the regions located at the both ends in the horizontal direction of the screen become dark as compared with the central region because the adjacent region is present only on the right side or left side, in other words the peripheral region has fewer adjacent regions supplying light thereto than the central region. This also applied to the case where the light emitting direction of an LED of each region is, for example, from top to bottom of the LED of a screen, or to the case where the light emitting direction of the LED is from one end to the other end in the horizontal direction of a screen.

In this manner, when a light guide plate split into a plurality of regions is used in order to carry out areal control, a region located at the point of the origin of the light emitting direction of an LED becomes darker than regions located ahead in the light emitting direction, and furthermore, the brightness of a region located at an end of a screen in a direction perpendicular to the light emitting direction of the LED becomes dark as compared with the brightness in the center. Accordingly, an illumination apparatus with such a configuration has a problem of generation of the so-called uneven brightness that the brightness differs depending on the location of the region.

The above-described conventional art, does not take into consideration at all the uneven brightness when a light guide plate split into a plurality of regions is used.

Moreover, the conventional art does not take fully into consideration the reduction of the uneven brightness in particular between light sources when a light source is constituted by a plurality of light sources.

Moreover, an LED has a light emission characteristic that light radially spreads around the center (optical axis) of its lighting surface. Here, the optical axis is an axis extending from the center of the light emitting surface of an LED to a direction perpendicular to the light emitting surface. For example, in the case where an LED is a side view type LED whose light emitting direction is parallel to an electrode surface, when this side view type LED is seen from above (from the upper side), light is emitted so as to radially spread, around the optical axis, forwardly from the lighting surface side.

In the above-described conventional art, the light shielding member or the light reflective/absorbing member provided in the light guide plate does not have a configuration taking into consideration the above-described light emission characteristic of the LED. Therefore, in the conventional art, it is difficult to suitably reduce such an uneven brightness that the light intensity locally increases in the vicinity of the LED, as described above.

Moreover, in the case where a light source is configured by arranging a plurality of LEDs in a predetermined direction, the light emitted from an LED does not sufficiently reach a portion between the LEDs, and therefore the portion between the LEDs becomes a dark portion that is locally dark, causing the uneven brightness. The above-described conventional art does not consider the uneven brightness also caused by such a dark portion between the LEDs.

The present invention is characterized by the configurations as set forth in the claims.

More specifically according to an aspect of the present invention, an illumination unit comprises: a light emitting element as a light source; and a tabular light guide plate including a plurality of regions having a light emitting surface for emitting light from the light emitting element as planar light, wherein a recessed portion is formed in an opposite surface of the light emitting surface of the light guide plate, and wherein the light emitting element is provided in the recessed portion so that an optical axis of the ht emitting element becomes parallel to the light emitting surface of the light guide plate. Here a plurality of light emitting elements are arranged along a longer direction of the recessed portion, wherein a dimming pattern is provided at a location corresponding to the plurality of light emitting elements of the light emitting surface of the light guide plate, respectively, and the shape or the size of the dimming pattern is varied with a location on the light emitting surface of the light guide plate, in particular, the size of the dimming pattern in the vicinity of a peripheral portion of a screen is made smaller than the dimming pattern in the center of the screen.

According to the present invention, when a light guide plate including a plurality of regions is used, the uneven brightness due to the location of a region can be suitably reduced.

BRIEF DESCRIPTION OF THE DRAWINGS

FIG. 5 is a perspective view illustrating a configuration example of an illumination board 10 illustrated in FIG. 4.

DETAILED DESCRIPTION OF THE EMBODIMENTS

Figure 1:
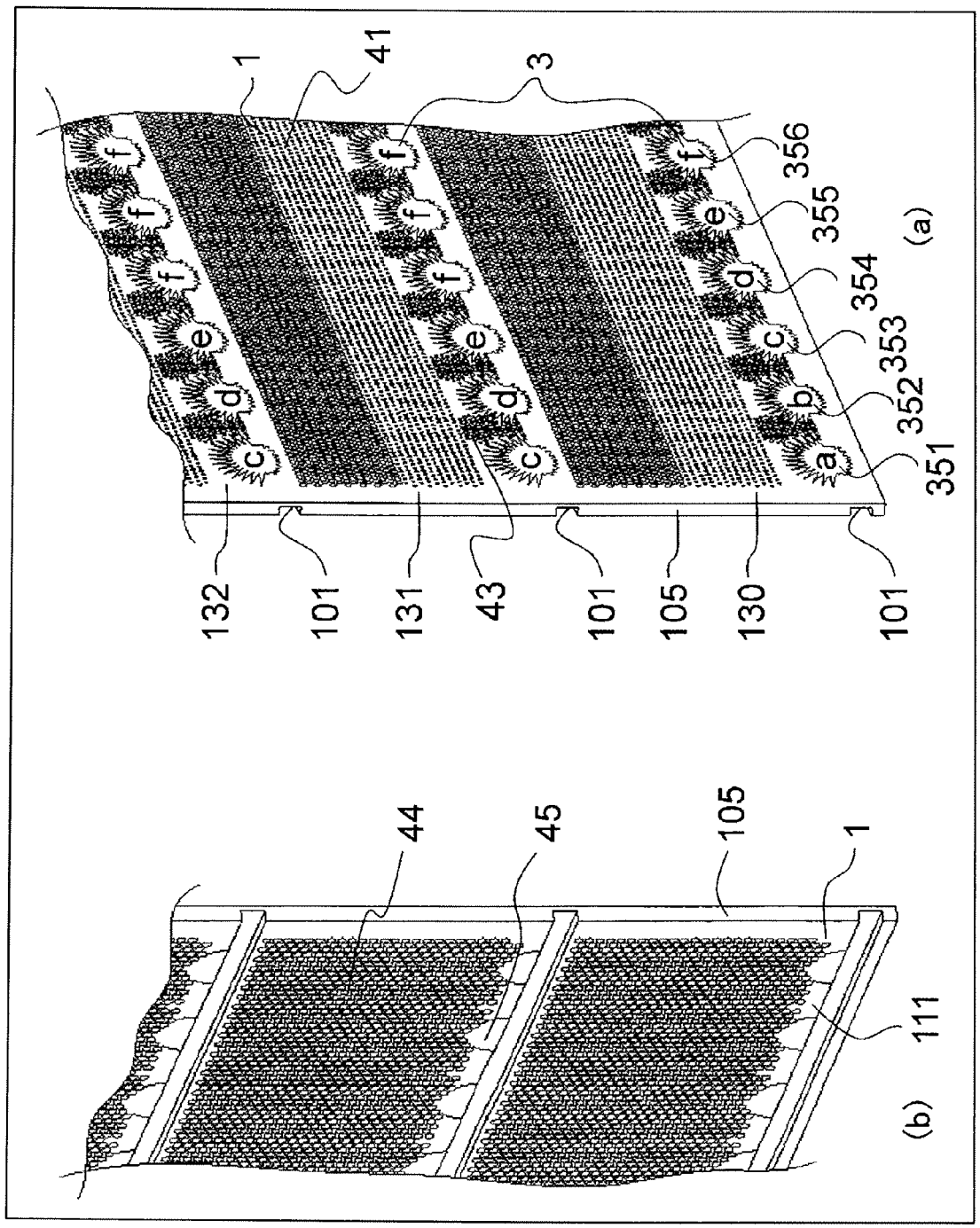
FIG. 1 is a view illustrating a dimming pattern portion and its periphery according to a first embodiment of the present invention.

Hereinafter, the embodiments of the present invention will be described reference to the accompanying drawings. Note that, in each view or each embodiment, the same reference numeral is attached to an element having the same configuration, function, or effect, and repeated explanation thereof is omitted.

Embodiment 1

FIG. 1 illustrates an example of a dimming pattern 3 of a light guide plate 1 according to a first embodiment of the present invention. The embodiment is characterized in that the shape of the dimming pattern 3 arranged in rows in a predetermined direction the horizontal direction of a screen) for each stage is varied with the distance from an end of the light guide plate 1, and in that one row of light guide pattern 3 on the lowermost stage has a different shape as compared with the dimming pattern 3 on the stages thereabove. The detail of the embodiment is described later. First, the detailed description of a display apparatus and an illumination unit, to which the embodiment is applied, is provided using FIG. 2 to FIG. 6.

Figure 2:
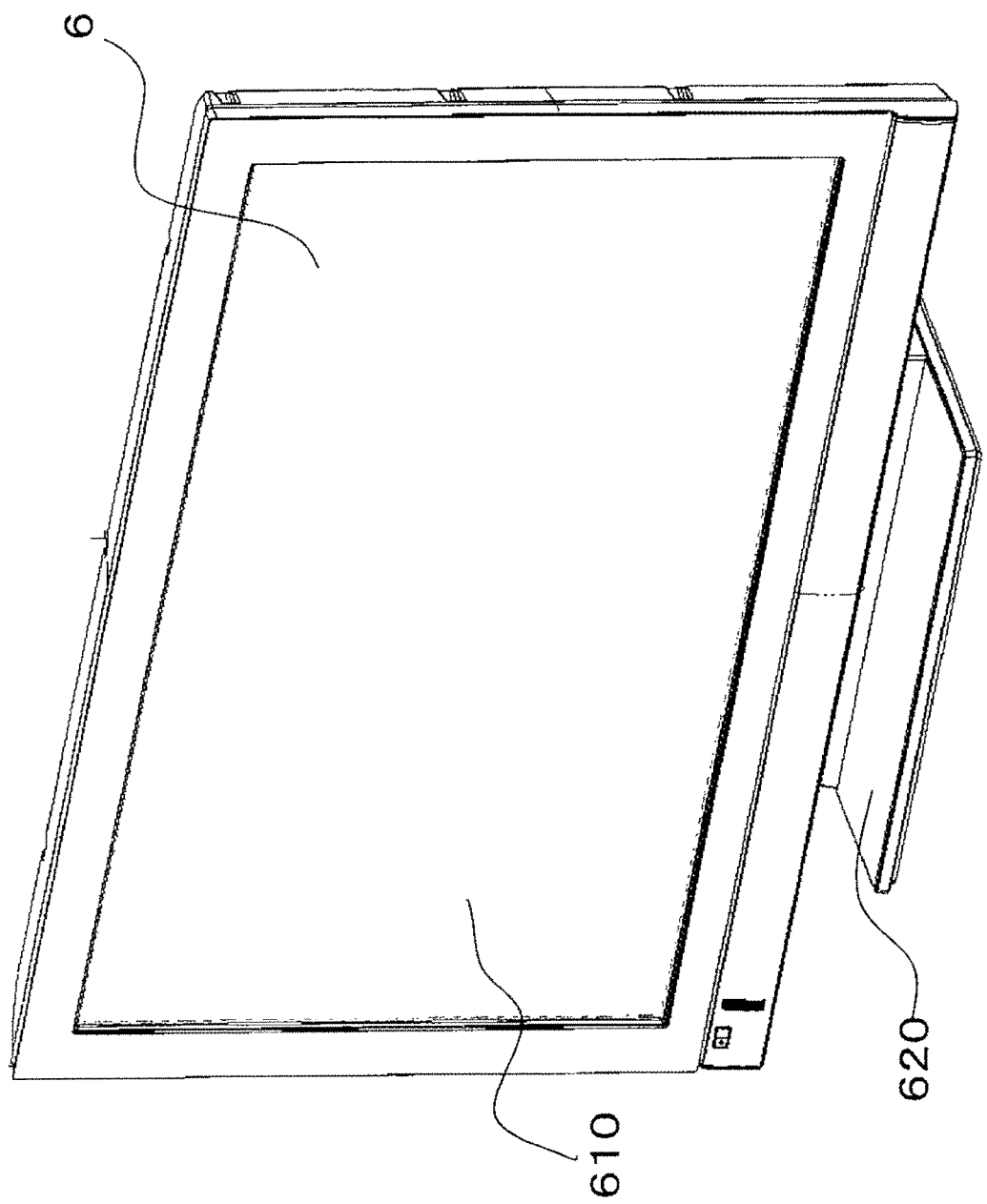
FIG. 2 is a perspective view illustrating an exemplary external view of a display apparatus 6 to which the present invention is applied.

FIG. 2 is a perspective view illustrating an exemplary external view of a display apparatus to which the present invention is applied, in FIG. 2, as an example of the display apparatus, a form of a television set is taken as an example.

In FIG. 2, the display apparatus 6 is a liquid crystal display apparatus using a liquid crystal display panel, and comprises a display unit 610 and a stand unit 620 supporting the display unit 610 from thereunder. Inside the display unit 610, as described later, the liquid crystal display panel that is a display device and an illumination unit are provided.

Figure 3:
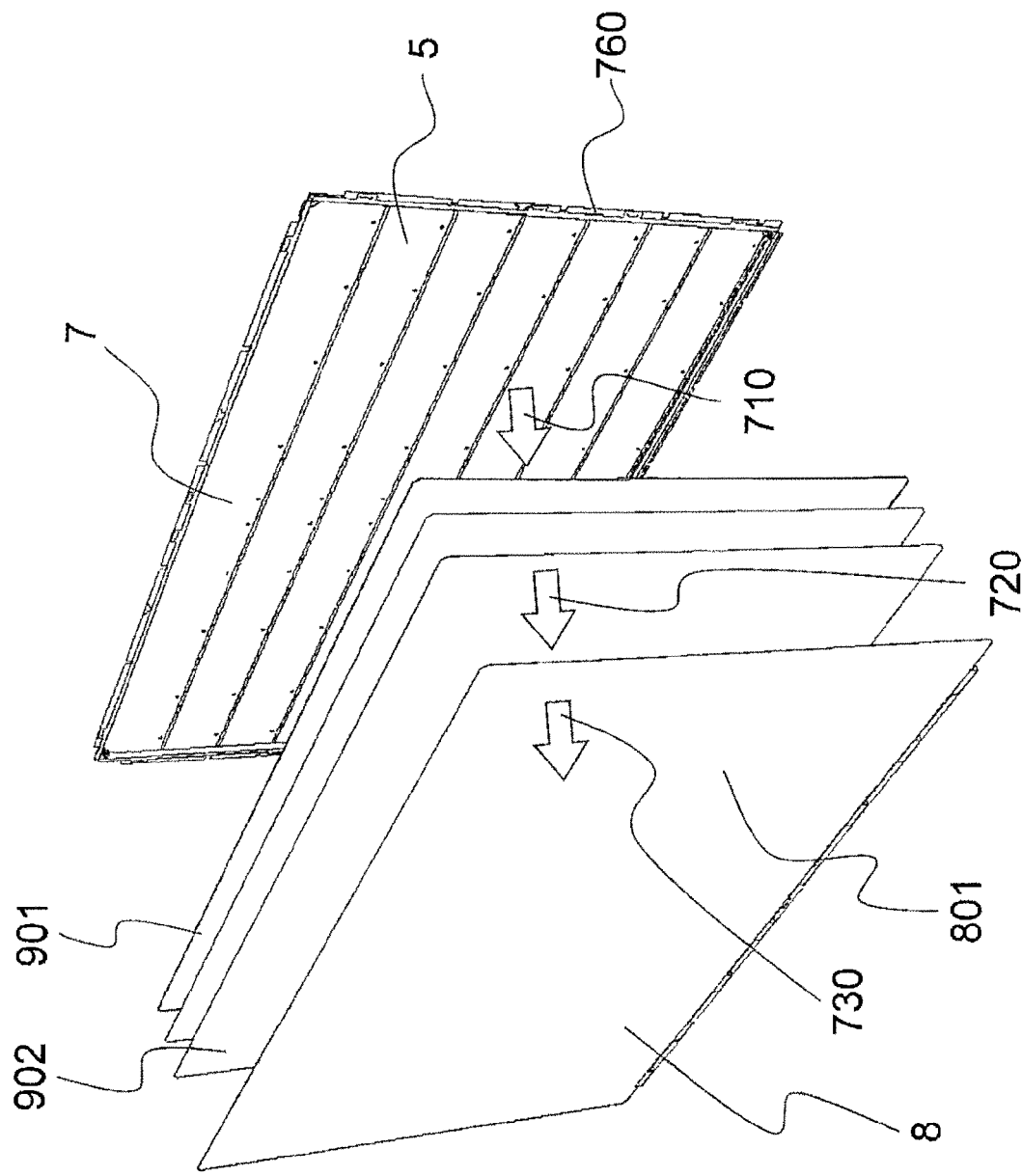
FIG. 3 is an exploded perspective view illustrating an example of the arrangement of main components in a display unit 610 illustrated in FIG. 2.

FIG. 3 is an exploded perspective view illustrating an example of the arrangement of main components in the display unit 610 of the display apparatus 6 illustrated in FIG. 2.

In FIG. 3, the main parts constituting the display apparatus 6 are a liquid crystal display panel liquid crystal cell) 8 and an illumination unit 7 that is a back light for radiating light from the rear surface of the liquid crystal display panel 8. Here, light exiting from the illumination unit 7 travels as shown by an arrow 710, and reaches the liquid crystal display panel 8 through a diffuser 901, a prism sheet 902, and the like as shown by an arrow 720. A video signal is supplied to the liquid crystal display panel 8, and the light transmittance of a liquid crystal element constituting each pixel is controlled based on this video signal. Then, light that is incident upon the liquid crystal display panel 8 as shown by the arrow 720 is spatially modulated by each pixel of the liquid crystal display panel 8 to form an optical image, which is displayed on a light emitting surface 801 as an image. That is light incident upon the liquid crystal display panel 8 is emitted as image light as shown by an arrow 730

The illumination unit 7 comprises a single sub-illumination unit 5 or a combination of a plurality of sub-illumination units 5, and is attached to a lower chassis 760 constituting the whole illumination unit 7 and held.

The internal configuration of the sub-illumination unit 5 continues to be described with reference to FIG. 4. In (a) of FIG. 4, a plurality of LEDs 2 are attached to the light guide plate 1 via the illumination board 10 so as to be arranged with a predetermined spacing along a predetermined direction. Here, the LED 2 is provided so that the light emitting direction thereof becomes a direction parallel to the light emitting surface 110 of the light guide plate 1, i.e. so that the optical axis of the LED 2 becomes parallel to the light emitting surface 110 of the light guide plate 1. Light emitted from the LED 2 is incident upon a light incident surface 102 of the light guide plate 1 and travels inside the light guide plate 1, and is appropriately radiated from the light emitting surface 110 of the light guide plate 1, and reaches the liquid-crystal panel cell 8 via the diffuser 901, the prism sheet 902, and the like. Here, in the embodiment, the LED 2 is a side view type LED, and emits white light. With the use of the side view type LED, just by attaching the LED 2 to the illumination board 10, the light emitting direction of the LED 2 becomes a direction parallel to the light emitting surface 110 of the light guide plate 1.

In the embodiment, a recessed portion 101 is formed in a surface (hereinafter, n some cases referred to as a rear surface) on the opposite side of the light emitting surface 110 of the light guide plate 1, and the LED 2 is arranged in the recessed portion 101 formed in the rear surface of the light guide plate 1. Here, the recessed portion 101 comprises a groove which, in the embodiment, extends in the horizontal direction (the depth direction of the plane of the figure, equal to the horizontal direction (lateral direction) of the liquid crystal display panel 8) of the light guide plate 1, and therefore, this recessed portion will be hereinafter referred to as a groove portion. This groove portion is formed continuously in the horizontal direction of the light guide plate 1. One side of the groove portion 101 is the light incident surface 102 described above, and light emitted from the LED 2 is captured into the light guide plate 1 from the incidence plane 102 that is one side of the groove portion 101.

Figure 4:
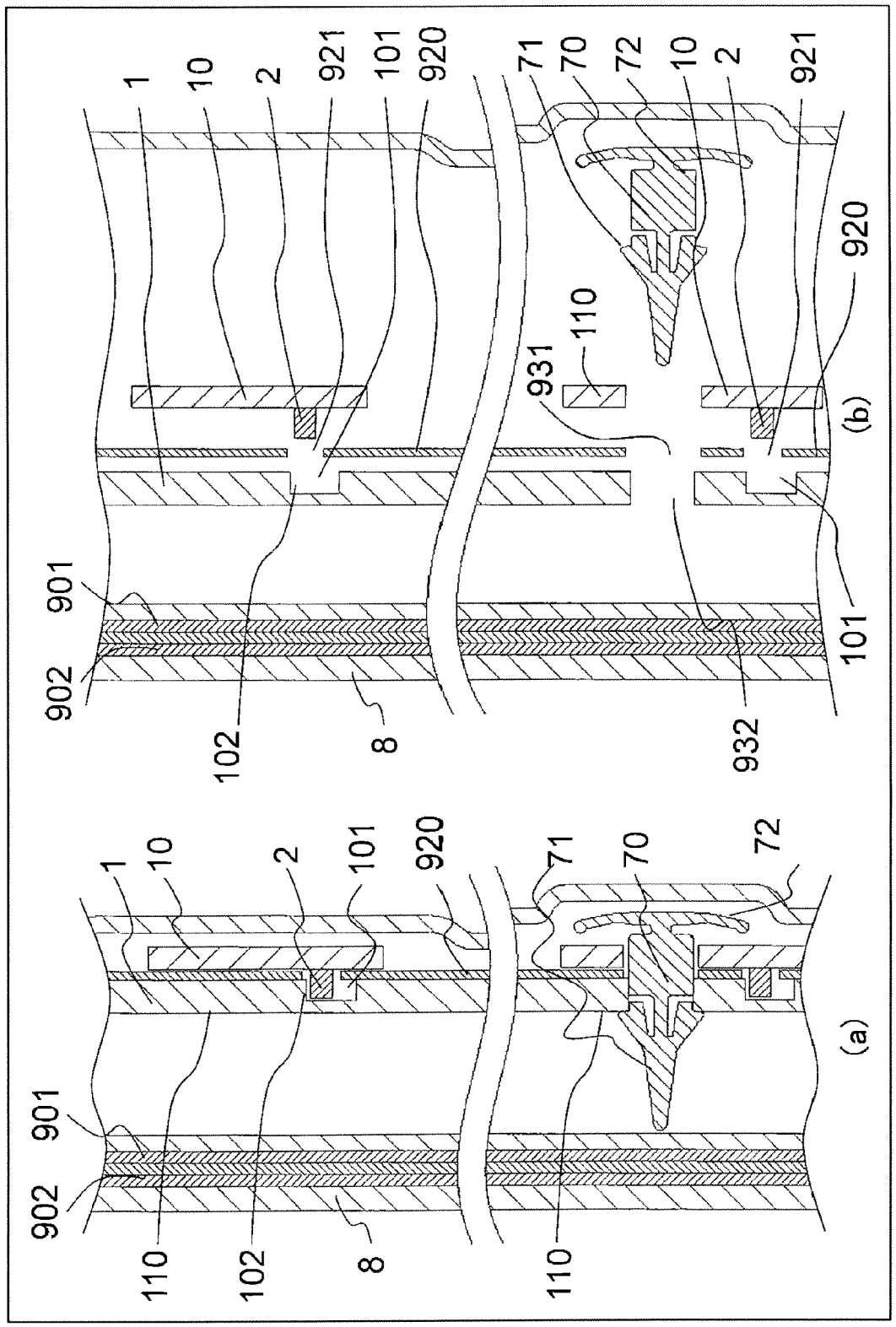
FIG. 4 is a cross sectional view illustrating a configuration example of an nation unit 5 illustrated in FIG. 3.

(B) of FIG. 4 illustrates an exploded view of the illumination unit 5. A reflective sheet 920 is provided between the light guide plate 1 and the illumination board 10 on which the LED 2 is mounted. That is, the reflective sheet 920 is sandwiched and held by the rear surface of the light guide plate 1 and the illumination board 10 so as to be arranged on the rear side of the light guide plate 1. By means of the reflective sheet 920, light transmitting through to the outside from the rear side of the light guide plate 1 is reflected and returned into the light guide plate 1. This improves the light use efficiency. Then, the LED 2 is exposed from an LED hole 921 provided in the reflective sheet 920, and the light emission portion of the LED 2 is inserted into the groove portion 101 of the light guide plate 1. A holding structure of the illumination board 10 with respect to the light guide plate 1 is attached using a pin mould 70 projecting in the thickness direction of the light guide plate 1 and having a tapered shape toward the liquid crystal display panel 8 side. In the embodiment, the pin mould 70 comprises resin and has a predetermined elasticity, and furthermore includes a front claw 71 and a back claw 72. Then, the pin mould 70 extends through an illumination board hole 930, a reflective sheet hole 31, and a light guide plate hole 932, and then sandwiches and holds the illumination board 10, the reflective sheet 920, and the light guide plate 1 by the front claw 71 and the back claw 72.

FIG. 5 is a perspective view illustrating a configuration example of the illumination board 10. As illustrated in FIG. 5, the illumination board 10 has a rectangular shape with the horizontal direction of the light guide plate 1 as the longer direction. A plurality of LEDs 2 are arranged with a predetermined spacing along the longer direction of the illumination board 10, and are attached to the illumination board 10 by soldering or the like. Moreover, a plurality of illumination board holes 930 are provided in the illumination board 10, and as with the description of FIG. 4 the pin mould 70 is inserted thereinto and attached and secured to the light guide plate 1.

Figure 6A:
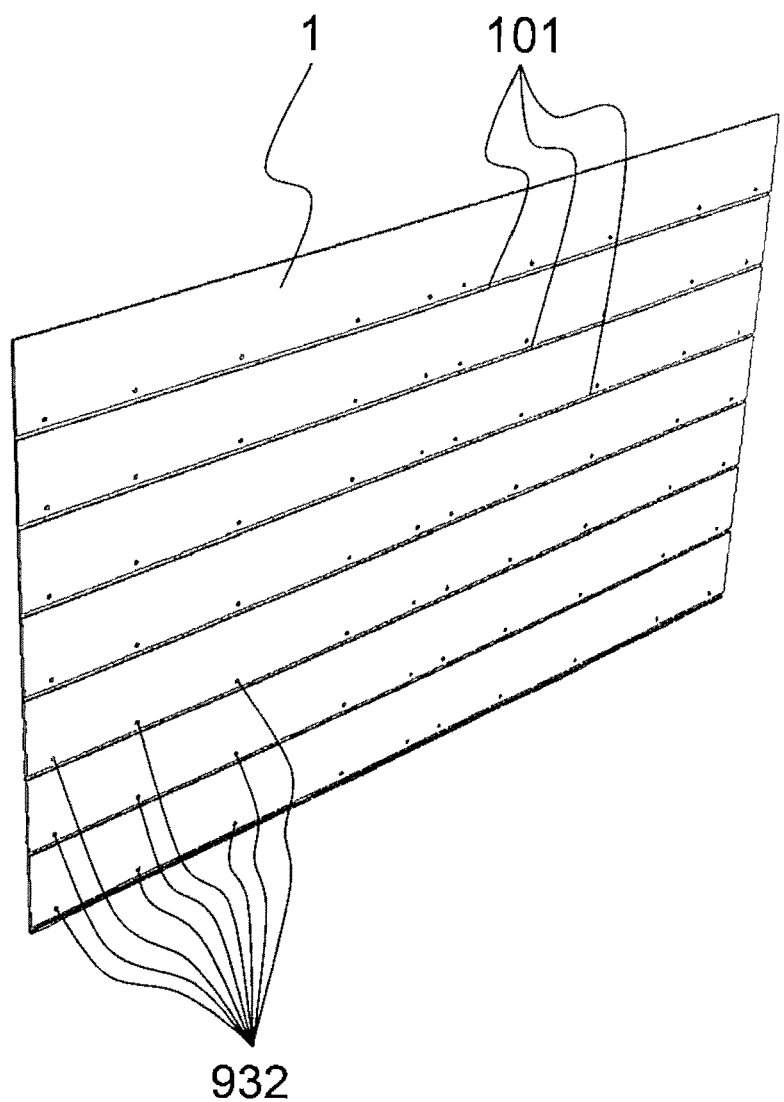
FIGS. 6A and 6B are perspective views illustrating an example of the outer shape of a light guide plate 1 used in an embodiment of the present invention.
Figure 6B:
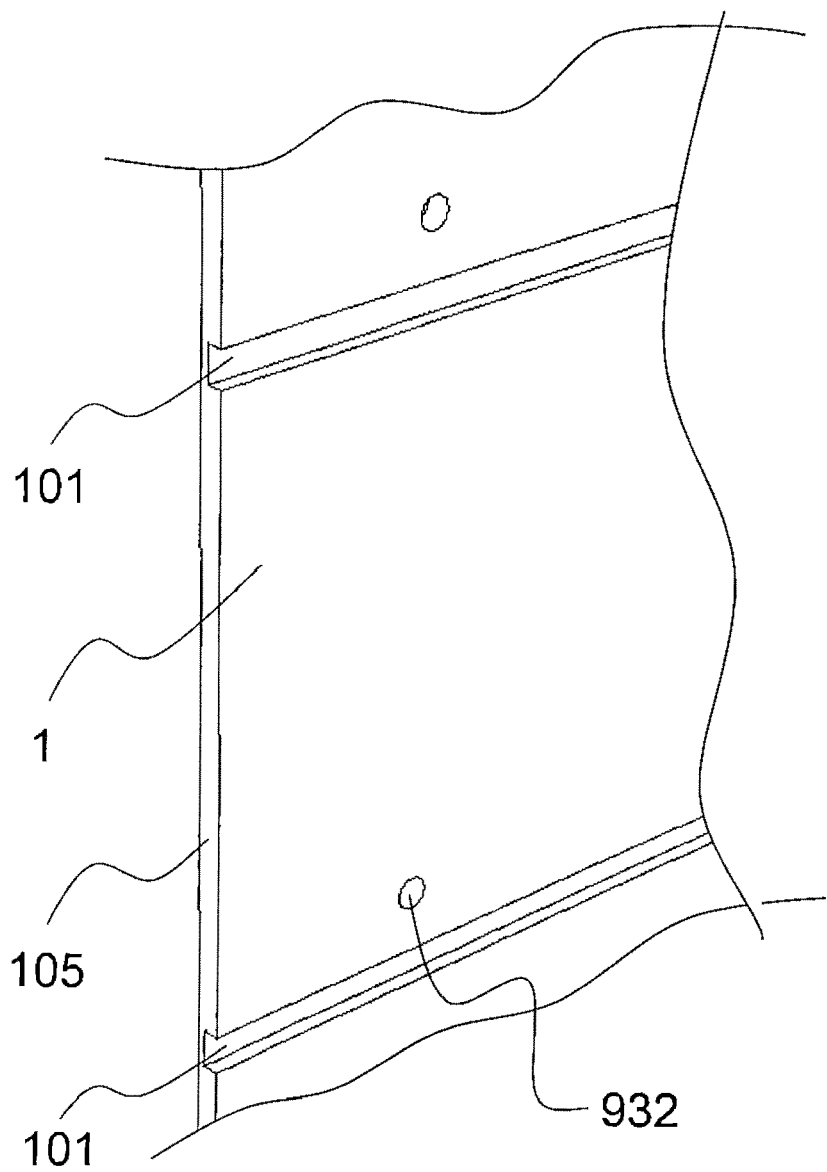

FIGS. 6A and 6B are perspective views illustrating an example of the outer shape of the light guide plate 1 illustrated in FIG. 1, FIG. 4, and the like. FIG. 6A illustrates the rear side (the side on which the groove portion 101 is formed) of the light guide plate 1, and FIG. 6B illustrates an enlarged view of the end of the light guide plate 1.

As illustrated in FIG. 6A, the light guide plate 1 according to the embodiment comprises one tabular light guide plate having substantially the same size as the display surface of the liquid crystal display panel. Moreover, on the rear side thereof, as illustrated in FIG. 6B, a plurality of groove portions 101, which are formed continuously from one end 105 in the horizontal direction of the light guide plate 1 to the other end, are provided in parallel. In this example, seven groove portions 101 are assumed to be provided. Here, the groove portion 101 is assumed to be formed also in the lowermost end of the light guide plate 1. A plurality of LEDs are inserted into each groove portion 101, and the LEDs 2 of each groove are configured so that the light intensity thereof is individually controlled, respectively. Moreover, a plurality of LEDs 2 inserted into each groove portion 101 are also divided into a plurality of groups. For example, when the number of LEDs inserted into one groove portion 101 is 30, these are divided into 10 groups, each group having three LEDs, and these groups are configured so that LEDs of each group are individually controlled, respectively. Accordingly, in this example, the light guide plate 1 is divided into a total of 70 (virtual) regions of 7×10. This region is the minimum unit in which the intensity of light is controlled, and the light intensity (i.e., the light intensity of LEDs corresponding to each region, the light intensity of three LEDs in this case) of each region is controlled in accordance with the brightness of a video signal corresponding to each region. This enables the so-called areal control (local dimming).

Moreover, a plurality of light guide plate holes 932, into each of which the pin mould 70 for attaching the illumination board 10 is inserted, are provided in the light guide plate 1.

Figure 7:
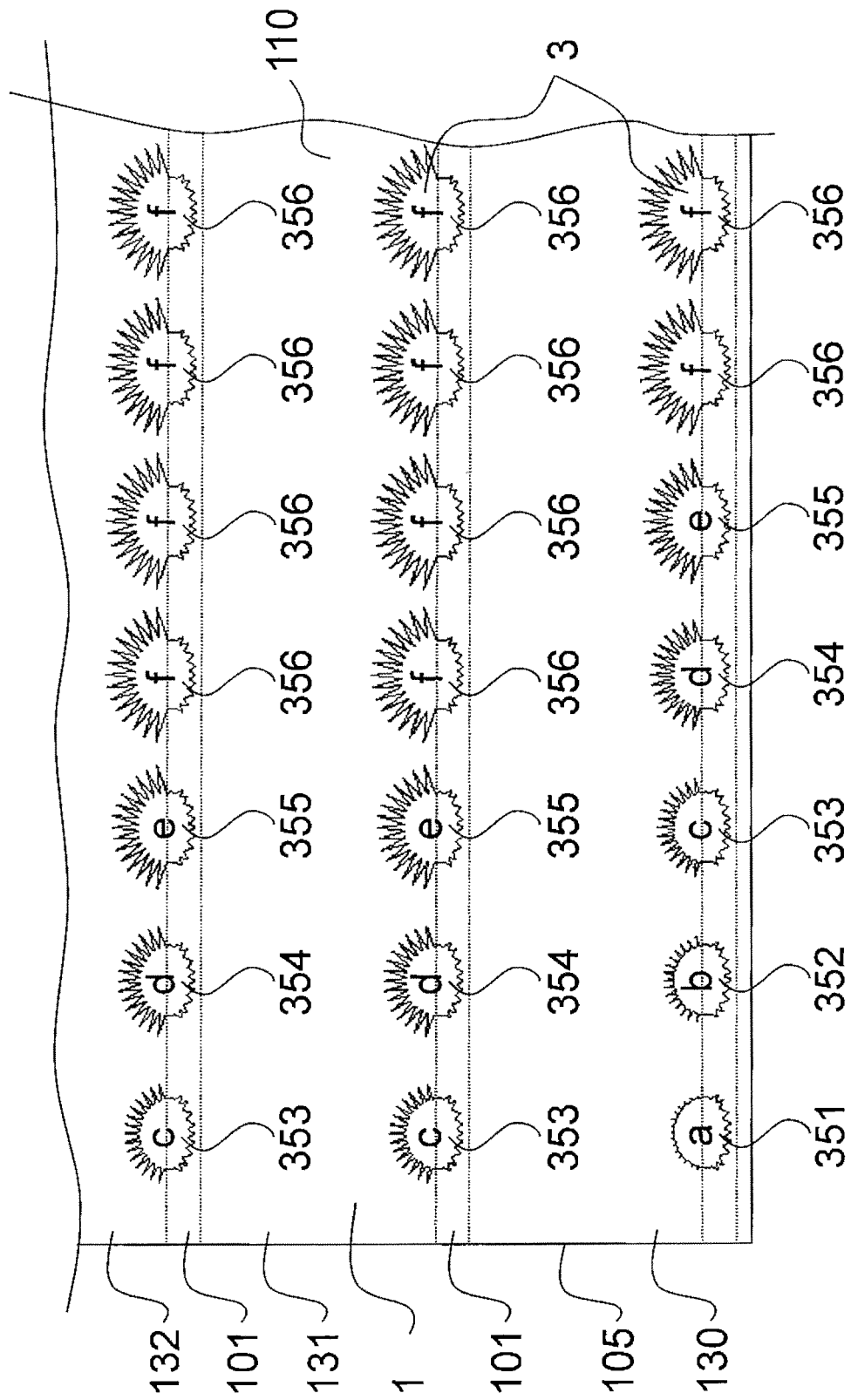
FIG. 7 is a view illustrating a dimming pattern formed in a light emitting surface of a light guide plate according to the first embodiment of the present invention.

FIG. 7 is a view illustrating the configuration of a dimming pattern formed on the light emitting surface 110 side of the light guide plate 1 according to the first embodiment of the present invention. This view aims to show a general form of the light emitting surface 110 and the reflective surface 111 for the purpose of illustration of the schematic configuration, and therefore the detailed part is simplified and illustrated so as not to obscure the drawing. Accordingly, the shape of the detailed pattern may differ between this view and the detail drawing described later. However, there is no difference in the content and the function, and the component with the same reference numeral has the same function and operation.

As illustrated in FIG. 7, on the light emitting surface 110 side of the light guide plate 1 the chestnut-shaped dimming pattern 3 is provided. The location of the dimming pattern 3 is set corresponding to the location of the LED 2 housed in the groove portion 101 provided on the light incident surface side of the tight guide plate 1.

Figure 8A:
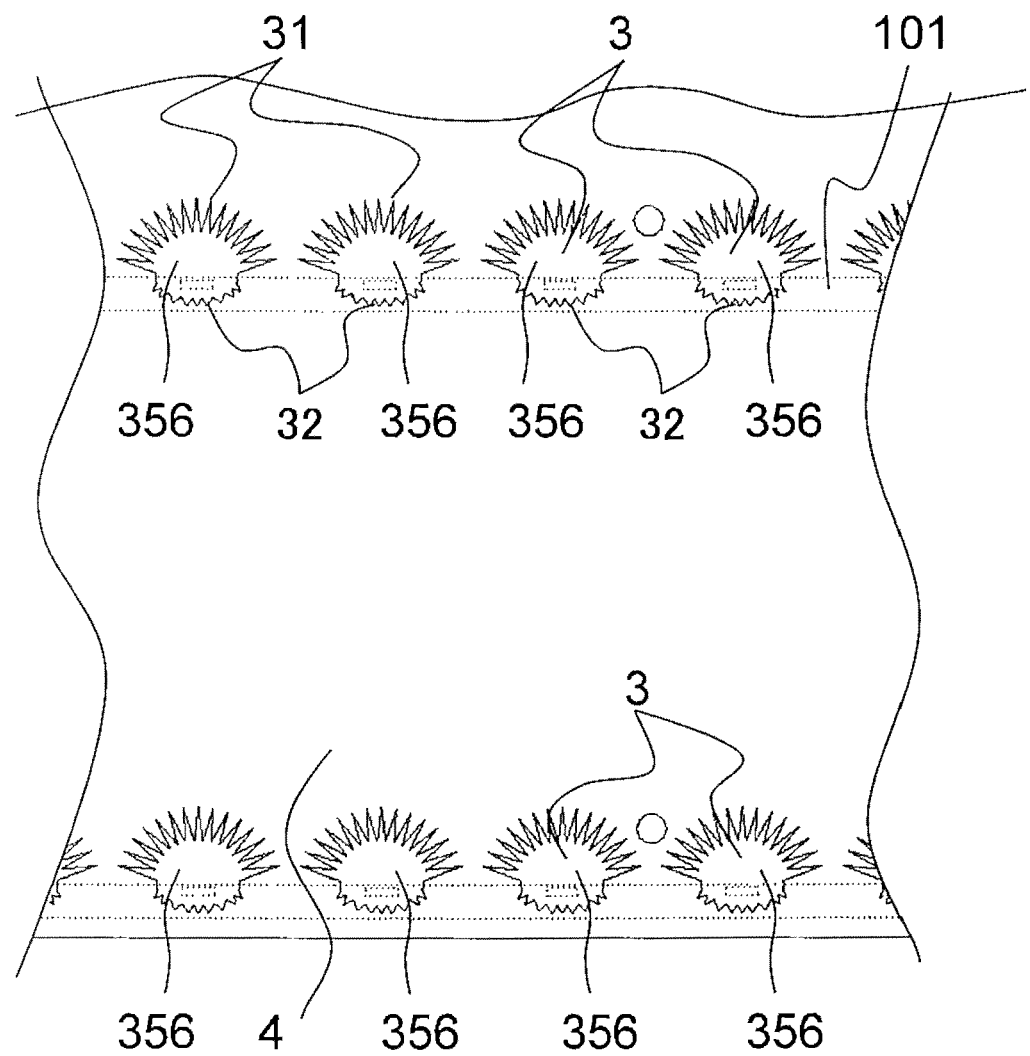
FIGS. 8A and 8B are views illustrating an example of the dimming pattern according to the first embodiment of the present invention.
Figure 8B:
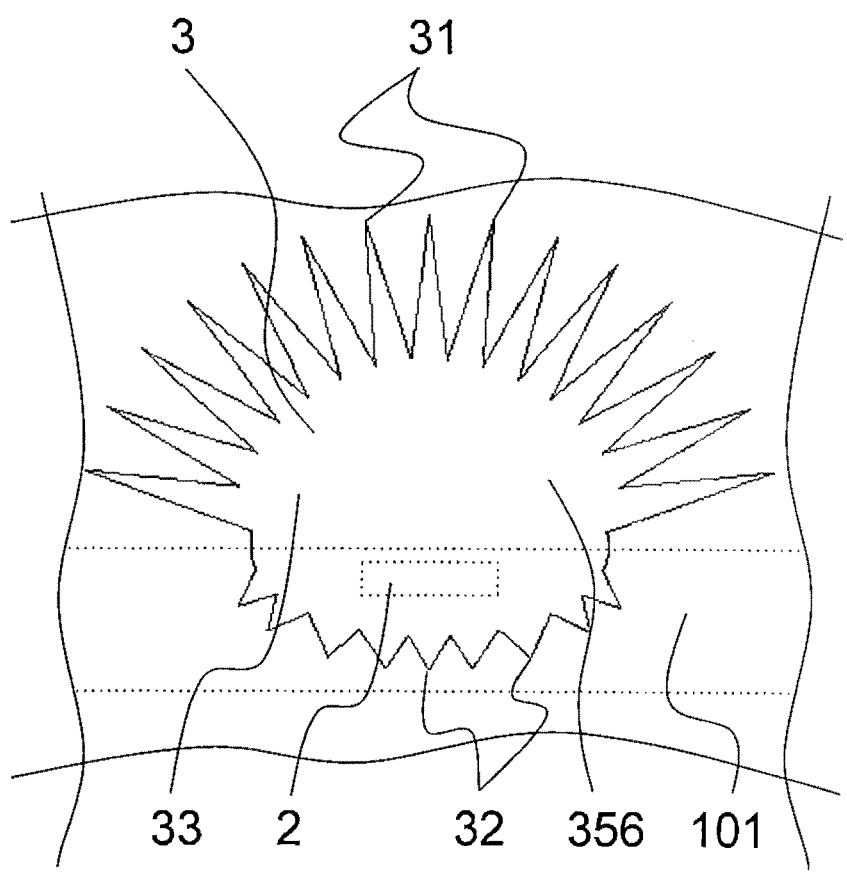

The detail of the shape of the dimming pattern 3 is illustrated in FIGS. 8A and 8B, for example. As illustrated in FIG. 8A, the dimming pattern 3 is provided in a portion directly above the LED 2 inside the groove portion 101 in the light emitting surface 110 of the light guide plate 1. The dimming pattern 3 according to the embodiment (here, a dimming pattern f356 of FIG. 7 is illustrated as a typical dimming pattern), as illustrated in FIG. 8B, includes: a main portion 33 located directly above the LED 2 and covering the center of the LED 2; a radial emission-side protrusion 31 extending from the center of the LED 2 to the light emitting side of LED 2 and a radial rear-side protrusion 32 extending to the rear side (the opposite side of the light emitting side) of the LED 2. Because the main portion 33 forms an elliptic shape with a direction perpendicular to the light emitting direction as a long axis, the main portion 33 will be referred to as the elliptic portion 33. However the main portion 33 may not be elliptic but may be circular. Moreover, the emission-side protrusion 31 and the rear-side protrusion 32 each have a tapered shape that gradually narrows with the distance from the LED 2 or the elliptic portion 33.

In the embodiment, the elliptic portion 33, the emission-side protrusion 31, and the rear-side protrusion 32 are connected to each other and integrated. Moreover, the dimming pattern 3 has an optical effect to reflect a part of light incident upon the dimming pattern 3 and cause a part thereof to transmit therethrough as described later, thereby reducing the intensity of light passing through the dimming pattern 3. The transmittance of the dimming pattern 3 is set to approximately 5% to 10% and the reflectance is set to 80% to 90%, for example.

As described above, the LED 2 is provided in the groove portion 101, and light exiting from the LED 2 is incident upon the light incident surface 102 of the light guide plate 1, and travels inside the light wide plate 1. Here, the side view type LED is used as the LED 2 as described above, however, even with the side view type LED, light transmits through the upper side of a package constituting the contour of the LED and travels toward directly above the LED 2. Moreover, the light reflected by the light incident surface 102 of the groove portion 101 travels toward directly above the LED 2. With such light, in the portion directly above the LED 2 of the light emitting surface 110 of the light guide plate 1, the light intensity locally increases as compared with in other portions. Hereinafter, this portion where the light intensity locally increases is referred to as an "optical spot." Because the light from the LED 2 radially spreads toward the light emitting direction, the optical spot will also have a radially spreading shape.

Then, in the embodiment, in the light incident surface 102 of the light guide plate 1, the dimming pattern 3 comprises a combination of the elliptic portion 33 covering particularly the portion directly above the LED 2 where the optical spot is generated, and the emission-side protrusion 31 radially extending toward the light emitting direction. Thus, the intensity of light emitted from the light incident surface 102 toward directly above the LED 2 and the intensity of light radially spreading toward the light emitting direction therefrom are weakened to reduce the brightness of the optical spot.

Moreover, because light turns around also to the rear side (the opposite side of the light emitting surface) of the LED 2, the optical spot slightly radially spreads also in the rear-surface direction of the LED 2. Therefore, in the embodiment, by further providing the radial rear-side protrusion 32 extending to the rear side of the LED 2 as the dimming pattern 3, the light intensity of the rear side portion of the LED 2 in the light incident surface 102 of the light guide plate 1 can be weakened.

That is, the embodiment reduces the optical spot and suitably suppresses the uneven brightness by using the dimming pattern 3 with a shape taking into consideration the light emission characteristic of the LED 2. Hereinafter, the detail of the optical affect of the dimming pattern 3 is described.

In the elliptic portion 33 in the center of the dimming pattern 3, the light emitted from the LED 2 is dimmed and reflected. In the vicinity of the neighboring radial emission-side protrusion 31, in a portion where the protrusion is formed, light emitted from the LED 2 is dimmed and reflected as with the above-described elliptic portion, while in the space between the protrusions, i.e., a portion where the protrusion is not formed, corresponding to the valley between the protrusions, the light from the LED 2 is transmitted therethrough and emitted to the outside of the light guide plate 1. That is, in the vicinity of the radial emission-side protrusion 31, a different optical effect of extinction/reflection/transmission is provided depending on each location, and the quantity of light emitted from the light guide plate 1 as a whole is gradually varied and controlled by the shape of the emission-side protrusion 31. Moreover, for the portion of the light that is emitted from the LED 2 and turns around and travels to the rear side, by means of the radial rear-side protrusion 32, as the above-described emission-side protrusion 31, a different optical effect of extinction/reflection/transmission is provided depending on each location, thereby gradually varying the quantity of light emitted from the light guide plate 1. Here, because the emission-side protrusion 31 is formed longer than the rear-side protrusion 32, the range, in which the optical effect of the above-described extinction/reflection/transmission is provided, is larger in the emission-side protrusion 31 (that is, on the light emitting direction side of the LED 2).

Here, the detailed configuration of the dimming pattern 3 at each location of the light emitting surface 110 is described. Ad illustrated in FIG. 7, a dimming pattern a351, a dimming pattern b352, a dimming pattern c353, a dimming pattern d354, and a dimming pattern e355 are arranged in order from the end 105 of the lowermost stage 130 of the light guide plate 1, and the length of the above-described radial emission-side protrusion is gradually increased in this order, and hereinafter, the dimming pattern f356 serves as the dimming pattern in the center. Here, the vicinity of the end 105 on the left side is taken as an example and described, but also in the case of the end on the right side, similarly, the shape of the dimming pattern 3 is modified in accordance with the distance from the end.

Here, the reason why the shape (the length of the emission-side protrusion) of the dimming pattern 3 is gradually modified in accordance with the distance from the end 105 of the lowermost stage 130 is described. At the end of the light guide plate 1, as described above, the quantity of light received from its periphery is small as compared with in the center, and therefore even if a reflective sheet or the like is provided, the brightness of light in the end region inevitably becomes darker than in the central region. In this case, even if the shape of the dimming pattern that is set in the central region (under a bright condition) is applied to the end region as it is, a desired optical effect by the dimming pattern cannot be obtained and a step in brightness is generated in the dimming pattern portion, resulting, in uneven brightness. For this reason, as illustrated in FIG. 7, the shape of the dimming pattern is gradually varied (the length of the mission-side protrusion is gradually increased in this example) from the end where the brightness decreases so as not to generate the uneven brightness.

In the second stage 131, the dimming pattern c353, the dimming pattern d354, the dimming pattern e355, and the dimming pattern f356 are arranged in order from the end 105, the length of the radial emission-side protrusion in a diffusion portion is gradually increased in this order, and then the dimming pattern in the center is formed by repeating the dimming pattern f356.

In the third stage 132, the dimming pattern c353, the dimming pattern d354, the dimming pattern e355, and the dimming pattern f356 are arranged in order from the end 105, and the length of the radial emission-side protrusion in a diffusion portion is gradually increased in this order, and then the dimming pattern in the center is formed by repeating the dimming pattern f356.

In FIG. 7, both the second stage and the third stage are described with the vicinity of the end 105 on the left side taken as an example, but as the first stage, the similar dimming patterns are formed also at the end on the right side. In this manner, in the embodiment, the pattern configuration is the same between the second stage 131 and the third stage 132.

As described above, between the lowermost stage 130 of the light guide plate 1 and the second stage 131 and the subsequent stages, a change in the shape corresponding to the distance from the end of the light guide plate 1 of the dimming pattern 3 differs and also the configuration of the dimming, pattern 3 used on each stage is also modified. Here, the reason why the configuration of the dimming pattern is modified between the vicinity of the lowermost stage 130 and the next second stage 131 and the subsequent stages is described below. That is, the lowermost stage 130, there is no region (light source) on the preceding stage and therefore in the vertical direction of the light guide plate 1, it is not possible to receive light from other regions. For this reason, the brightness in the region on the lowermost stage 130 inevitably becomes dark as compared with other regions. In this case, even an arrangement structure including the shape of the dimming pattern that is set in an upper region (under a bright condition) is applied to the region on the lowermost stage 130 as it is, a desired optical effect by the dimming pattern cannot be obtained and a step in brightness is generated in the dimming pattern portion, resulting in uneven brightness. For this reason, as illustrated in FIG. 7, between the lowermost stage 130 and the stages thereabove, the shape and arrangement of the dimming pattern are varied so as not to result in the uneven brightness.

The configuration of the light guide plate 1 including the above-described dimming pattern according to the embodiment is described with reference to FIG. 1. As illustrated in (a) of FIG. 1, in the light emitting surface 110, as described above, the dimming pattern 3 including the dimming pattern a351, the dimming pattern b352, the dimming pattern c353, the dimming pattern d354, the dimming pattern e355, and the dimming pattern f356 is provided. Moreover, between the dimming patterns of each stage, there is provided an emission-surface side light guide pattern 41 that facilitates the emission of light traveling inside the light guide plate 1 from the light emitting surface 110, and furthermore, between a plurality of dimming patterns in one stage, there is provided an inter-LED uniforming pattern 43 for improving the brightness between LEDs that locally decreases. The emission-surface side light guide pattern 41 and the dimming pattern 3 described above each have a different transmittance, reflectance, and diffusivity of light, and are provided by printing using, for example, a different process, ink, or paint.

On the other hand, on the rear side of the light guide plate 1, i.e., on the reflective surface 111 side, as illustrated in (b) of FIG. 1, there are provided: a reflective-surface side light guide pattern 44 for suitably reflecting the light heading toward the reflective surface and guiding the same to the light emitting surface 110, and a reflective-surface side inter-LED guide pattern 45 for improving the brightness between LEDs that locally decreases. Moreover, the locations of these patterns are set corresponding to the location of the LED 2 provided in the groove portion 101 of the light guide plate 1. The reflective-surface side light guide pattern 44 and the reflective-surface side inter-LED light guide pattern 45 each have the same transmittance, reflectance, and diffusivity of light, and are provided by printing using, for example, the same process, ink, or paint.

Next, an optical effect in the vicinity of the dimming pattern f356 is described with reference to FIG. 9.

Figure 9:
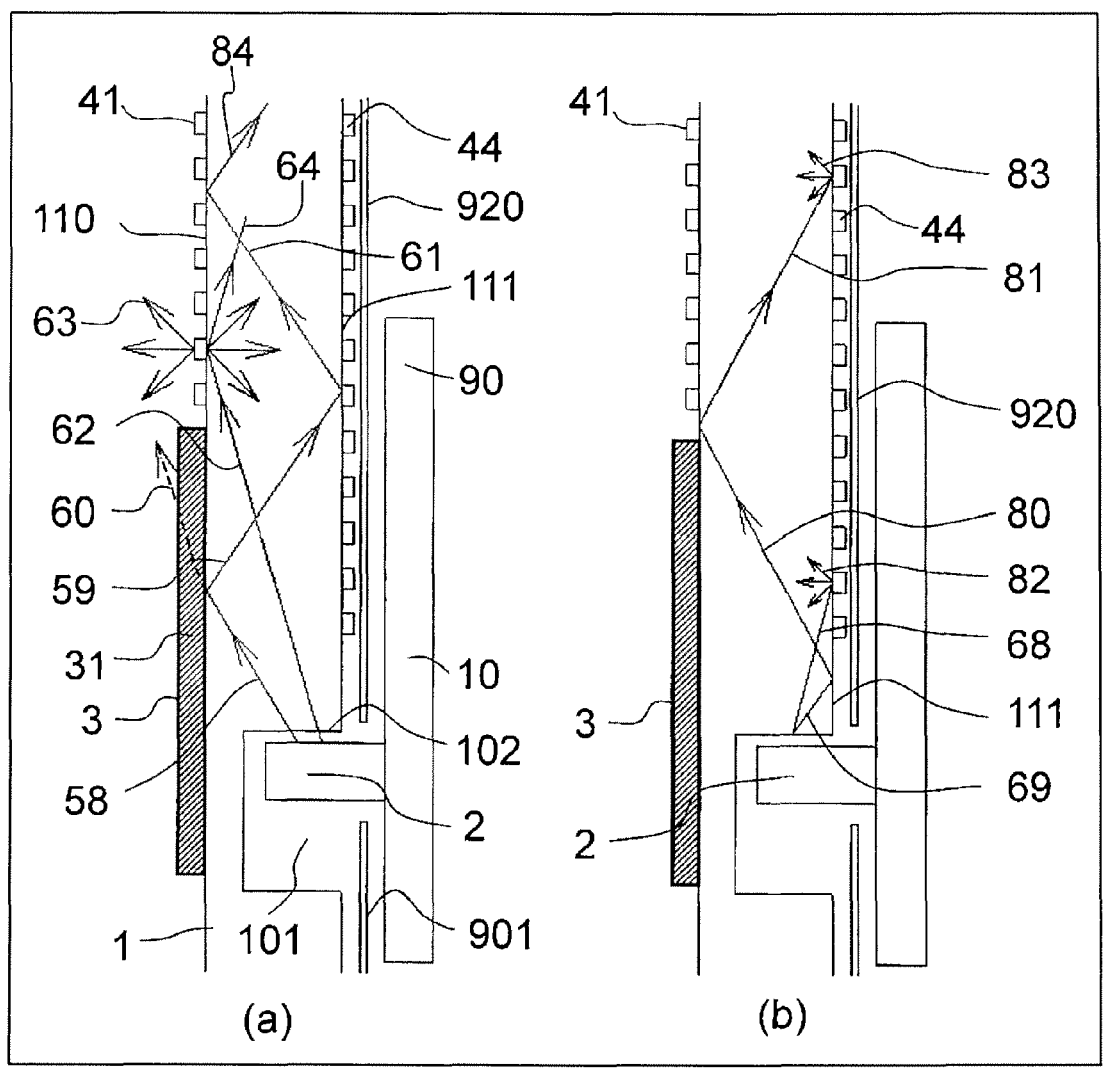
FIG. 9 is a view illustrating an optical effect by the dimming pattern of the first embodiment of the present invention.

As illustrated in (a) of FIG. 9, the dimming pattern f356 and the emission-surface side light guide pattern 41 are provided in the light emitting surface 110 of the light guide plate 1. Further, the LED 2 is provided in the groove portion 101 formed on the reflective surface 111 side on the opposite side of the dimming pattern 3, and the light exiting from the LED 2 is incident upon the light incident surface 102 of the light guide plate 1, and travels inside the light guide plate.

Here, for example, an optical effect of a light beam 58 is described. As illustrated in (a) of FIG. 9, the light beam 58 travels inside the light guide plate 1, is reflected by or transmits through the dimming pattern 3, and splits into a light beam 60 that has dimmed and transmitted therethrough and a light beam 59 that has been reflected. Furthermore, the light beam 59 is totally reflected on the reflective surface 111 side of the light guide plate 1 because the incident angle is equal to or less than a critical angle, and travels inside the light guide plate 1 as shown by a light beam 61, and is furthermore totally reflected by the light emitting surface 110, and travels inside the light guide plate 1 as shown by a light beam 84, and then travels to the outside of the light guide plate 1 from the light emitting surface 110 at a non-illustrated location.

Next, an optical effect provided to a light beam 62 having the angle of emergence with respect to the optical axis smaller than the light beam 58 is described. The light beam 62 travels to a location ahead of a location where the dimming pattern 3 of the light emitting surface 110 of the light guide plate 1 is formed. In this case, the light beam 62 strikes against the emission-surface side light guide pattern 41 provided in the light emitting surface 110. At this time, a part of the light transmits through the light emitting surface 110 (the emission-surface side light guide pattern 41) without being totally reflected, and exits while spreading as shown by a light beam 63. The incident angle of a part of the remaining light becomes equal to or less than the critical angle, and this light is reflected while diffusing, and a part thereof travels further inside the light guide plate 1 as shown by a light beam 64 and then travels from the light emitting surface 110 to the outside of the light guide plate 1 at a non-illustrated location.

In this manner, an emission light quantity adjusting member on the light emitting surface 110 side comprises the emission-surface side light guide pattern 41 and the dimming pattern 3 on the light emitting surface 110 side.

Next, an optical effect of the reflective-surface side light guide pattern 44 on the reflective surface 111 side is described using (b) of FIG. 9. For example, a light beam 68 travels inside the light guide plate 1, and strikes against the reflective-surface side light guide pattern 44 formed in the reflective surface 111. At this interface, the light beam 68 does not meet the total internal reflection condition, and is thus diffused by a dot portion of the reflective-surface side light guide pattern 44, and travels while scattering inside the light guide plate 1 and in the vicinity of the reflective sheet 920 as shown by a light beam 82. The light having traveled to the reflective sheet 920 is reflected and returns again to the light guide plate 1, and is emitted from the light emitting surface 110 to the outside of the light guide plate 1.

Moreover, a light beam 69 whose angle of emergence with respect to the optical axis is smaller than the light beam 68 travels inside the light guide plate 1 and reaches the reflective surface 111. Here, because the incident angle to the reflective surface 111 of the light beam 69 is equal to or less than the critical angle, the light beam 69 is totally reflected by the reflective surface 111, and travels inside the light guide plate 1 as shown by a light beam 80 and reaches the light emitting surface 110. Also here, because the incident angle to the light emitting surface 110 of the light beam 80 is equal to or less than the critical angle, the light beam 80 is totally reflected by the light emitting surface 110, and travels inside the light guide plate 1 as shown by a light beam 81, and is diffused by the dot portion of the reflective-surface side light guide pattern 44 in the reflective surface 111, and then travels while scattering inside the light guide plate 1 and in the vicinity of the reflective sheet 920 as shown by a light beam 83. The light having traveled to the reflective sheet 920 is reflected and returns again to the light guide plate 1, and is emitted from the light emitting surface 110 to the outside of the light guide plate 1. In this manner, by means of the dimming pattern 3 provided in the light emitting surface 110 and the reflective surface 111 of the light guide plate 1, the emission-surface side light guide pattern 41, the reflective-surface side light guide pattern 44, and the like, light can be uniformly extracted from the light guide plate 1.

In this manner, according to the embodiment, extraction of light in the vicinity of the dimming pattern f356 can be smoothly uniformed.

Continuously, the state of the uneven brightness on each stage according to the embodiment is described with reference to FIG. 10 and FIG. 11.

Figure 10:
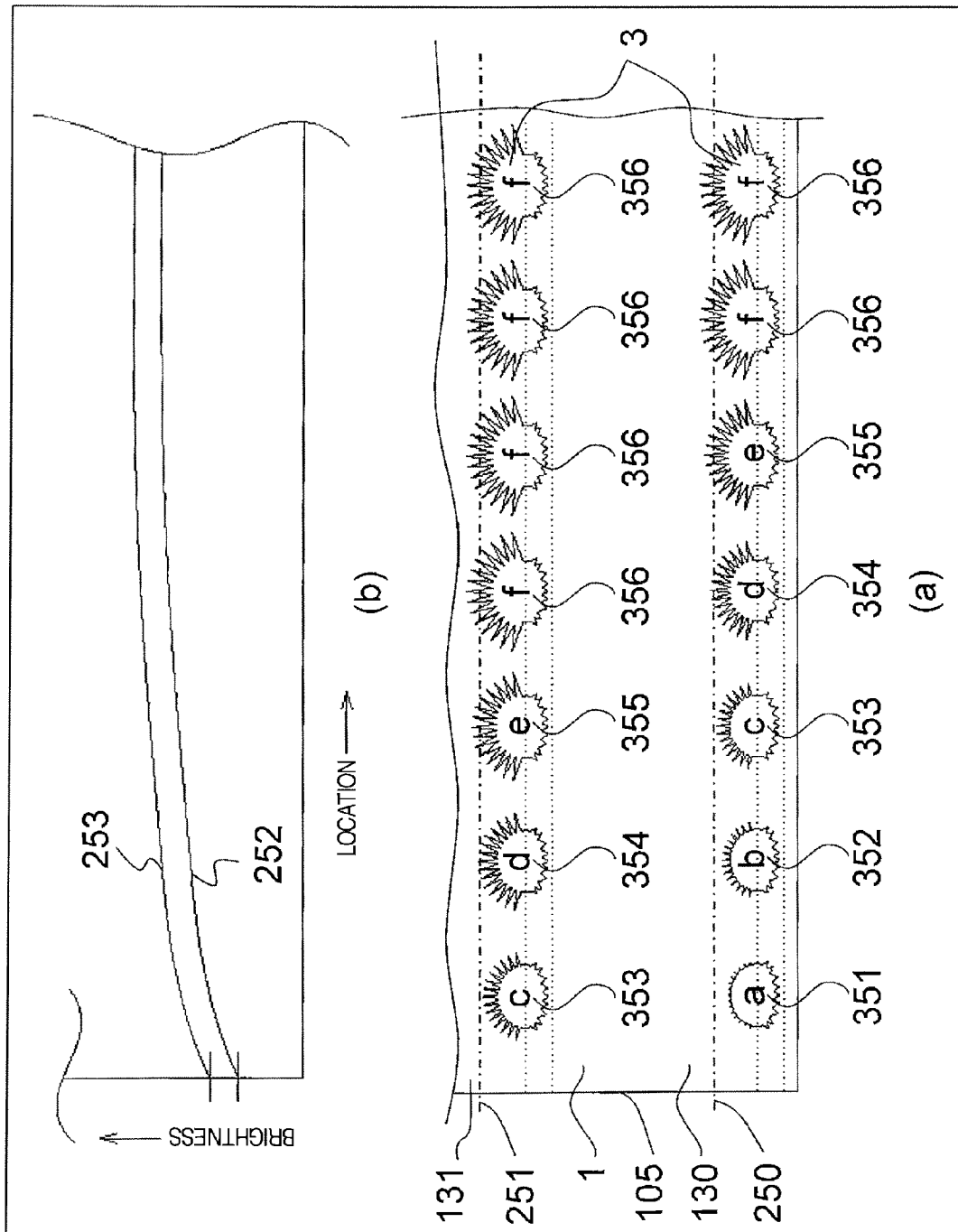
FIG. 10 is a view illustrating a horizontal brightness distribution obtained by the dimming pattern of the first embodiment of the present invention.

(A) of FIG. 10 illustrates the dimming pattern 3 provided in the light emitting surface 110 of the light guide plate 1, and the arrangement of the dimming pattern 3 is the same as the one described in FIG. 7. In addition, a brightness distribution that is the result of measuring the brightness along two lines of a lowermost-stage measurement line 250 and a second-stage measurement line 251 is shown in (b) of FIG. 10. In (b) of FIG. 10, the horizontal axis indicates the horizontal location of the light guide plate 1, and each location of the horizontal axis coincides with a measurement location of the light guide plate 1 of (a) of FIG. 10. The vertical axis represents the brightness, and the brightness variation is enlarged and shown for purposes of illustration.

A brightness distribution 252 of (b) of FIG. 10 shows the result measured at the location of the lowermost-stage measurement line 250 of (a) of FIG. 10, and a brightness distribution 253 corresponds to the second-stage measurement line 251.

That is, as going from the end 105 of the light guide plate 1 toward the center, the brightness gradually increases, as with the brightness distribution 252. Moreover, on an upper stage as the brightness distribution 253, the entire brightness distribution shifts in a brighter direction.

In this manner, depending on the location of the stage where an LED is arranged, the entire brightness of the stage differs. However, in the embodiment, because the shape of the light pattern is modified in accordance with the location of each stage, the curve of the brightness distribution draws a gentle curve with a small abrupt change in the horizontal direction (lateral direction) and there is no discontinuity in the curve. That is, according to the embodiment, the variation in the horizontal brightness distribution is reduced, thereby reducing the uneven brightness.

Figure 11:
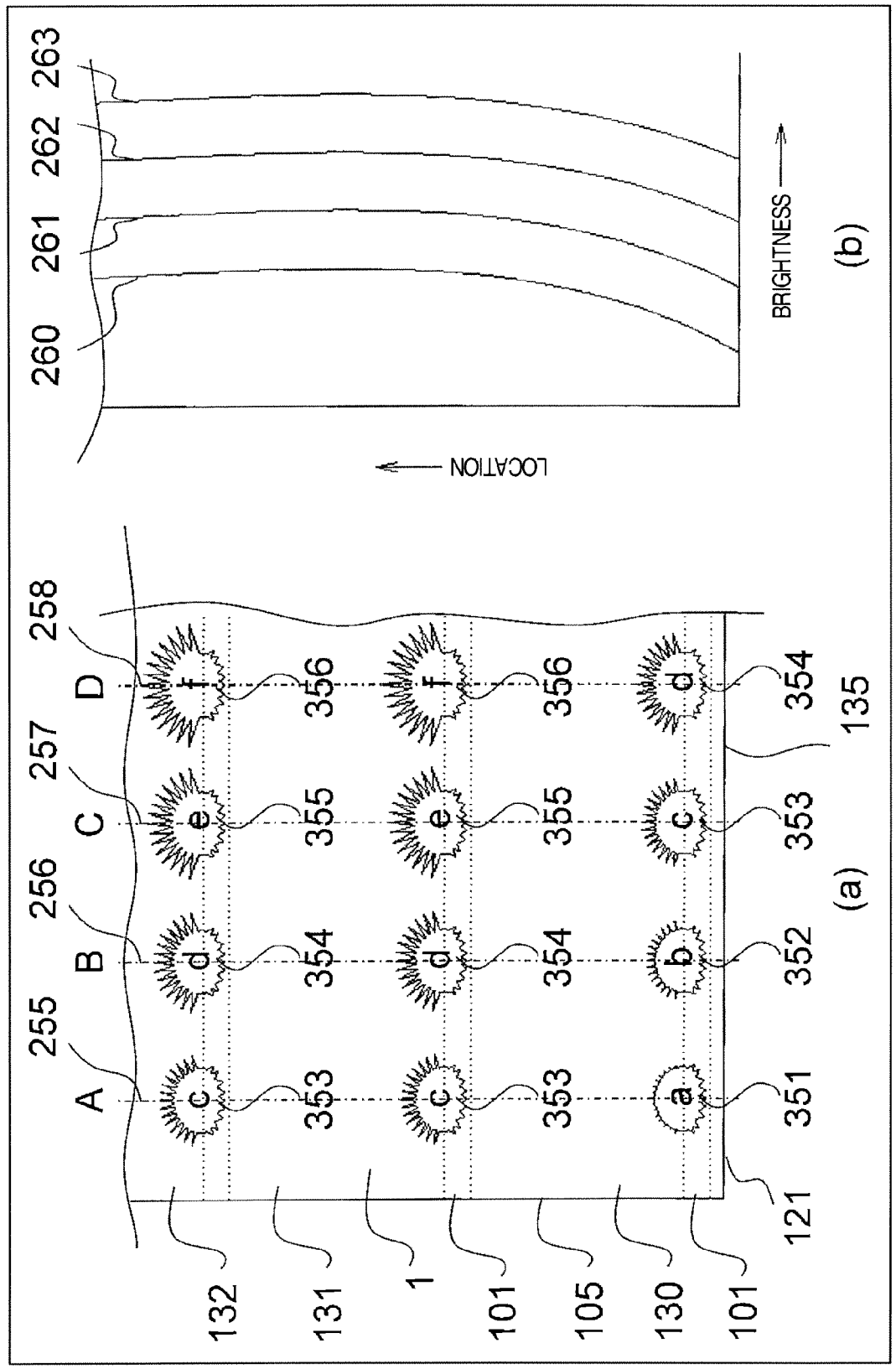
FIG. 11 is a view illustrating a vertical brightness distribution obtained by the dimming pattern of the first embodiment of the present invention.

FIG. 11 illustrates a state of the uneven brightness in the vertical direction of the screen.

(A) of FIG. 11 illustrates the dimming pattern 3 provided in the light emitting surface 110 of the light guide plate 1, and the arrangement of the dimming pattern 3 is the same as that described in FIG. 7. A brightness distribution that is the result of measuring the brightness along four rows of the first-row measurement line 255, the second-row measurement line 256, the third-row measurement line 257, and the fourth-row measurement line 258 in (a) of FIG. 11 is shown in (b) of FIG. 11. In (b) of FIG. 11 the vertical axis indicates the measurement location in the vertical direction of the light guide plate 1, and each location of the horizontal axis coincides with the measurement location of the light guide plate 1 of (a) of FIG. 11. The horizontal axis represents the brightness, and the brightness variation is enlarged and shown for purposes of illustration.

A brightness distribution 260 of (b) of FIG. 11 shows a result measured at the location of the first-row measurement line 255 of (a) of FIG. 11. Similarly, a brightness distribution 261 corresponds to the second-row measurement line 256, a brightness distribution 262 corresponds to the third-row measurement line 257, and a brightness distribution 263 corresponds to the fourth-row measurement line 258, respectively.

That is as going upward from an end 135 of the lowermost stage of the light guide plate 1, the brightness gradually increases as shown by the brightness distribution 260. Moreover, on the right stage as shown by the brightness distribution 261, i.e., at the location one row inward from the end 105 of the light guide plate 1, the entire brightness distribution shifts in the brighter direction.

In this manner, the brightness of the entire row differs with the location of a row where the LED is arranged. However, in the embodiment, because the shape of the light pattern is modified in accordance with the location of each row, the curve of the brightness distribution draws a gentle curve with a small abrupt change in the vertical direction (longitudinal direction) and there is no discontinuity in the curve. That is according to the embodiment, a variation in the brightness distribution in the vertical direction can be also reduced, thereby reducing the uneven brightness. As described above, in the embodiment, by arranging an appropriate dimming pattern in accordance with the location from the end of the light guide plate, light can be emitted with continuous brightness without generating a two-dimensional step in the brightness in the entire light emitting surface of the illumination unit.

Thus, according to the embodiment, in the cases where a light guide plate including a plurality of regions is used, an illumination unit suitably reducing the uneven brightness due to the location of a region can be provided. Furthermore, in a display apparatus applying this illumination apparatus, a high-quality image with a uniform brightness can be displayed.

Moreover, it is needless to say that the types (shapes) and sizes of the dimming patterns used in one stage is not limited to those illustrated in FIG. 7, and dimming patterns with more or fewer types (shapes) than those illustrated in FIG. 7 can be used.

Embodiment 2

Figure 12:
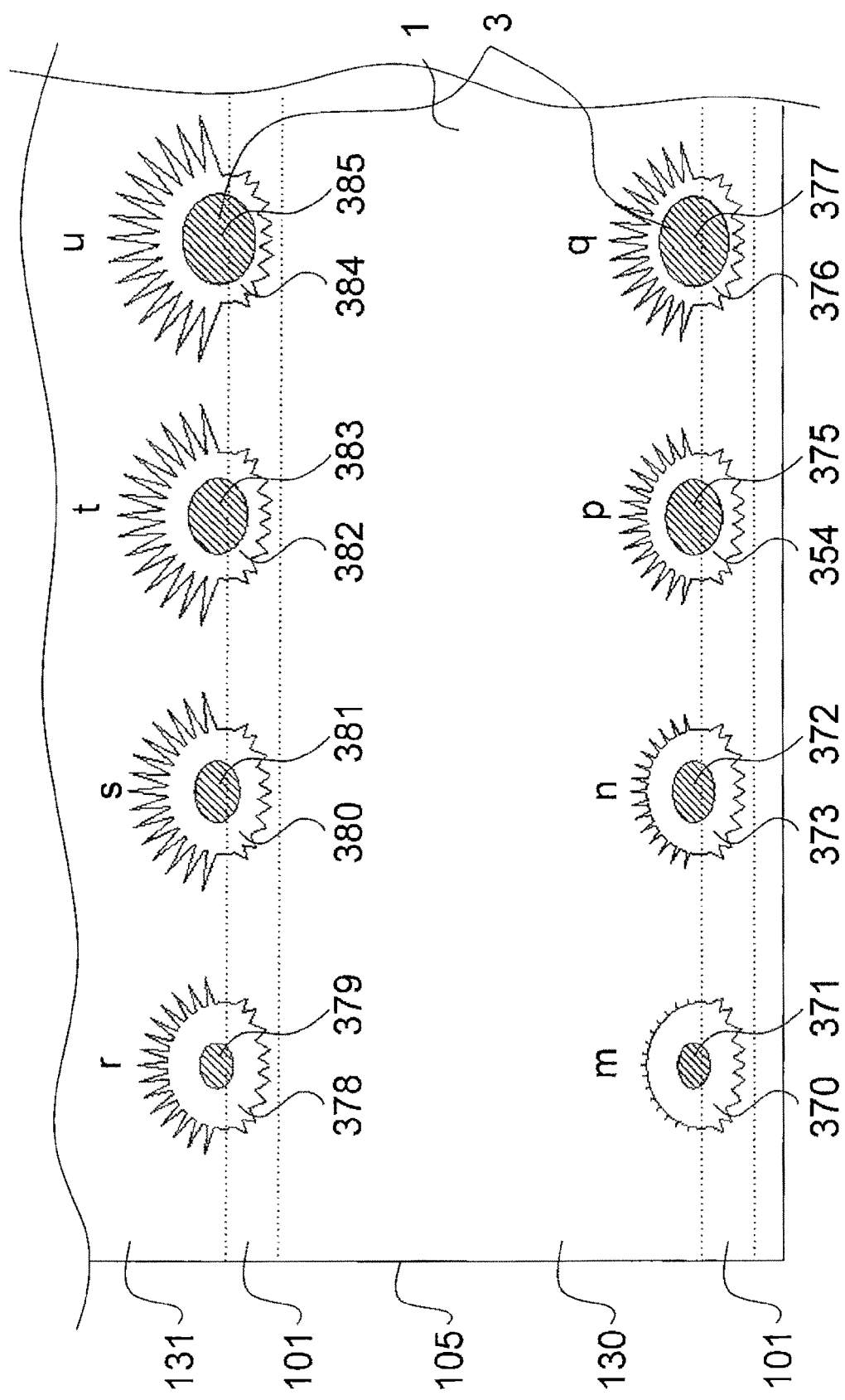
FIG. 12 is a view illustrating a second embodiment of the present invention.

Next, a second embodiment the present invention is described with reference to FIG. 12.

The embodiment differs from the first embodiment in that, in the first embodiment, each dimming pattern 3 comprises a material with a single transmittance, while in the embodiment, each dimming pattern is formed by overlapping or combining the materials with a plurality of (two) transmittances and shapes or sizes.

For example, in order from the end 105 of the lowermost stage 130 of the light guide plate 1, a combination pattern of a first dimming pattern m370 and a second dimming pattern mb371, a combination pattern of a first dimming pattern n372 and a second dimming pattern nb373, a combination pattern of a first dimming pattern p374 and a second dimming pattern pb375, and a combination pattern of a first dimming pattern q376 and a second dimming pattern qb377 are arranged, and furthermore, in this order, the shape/size of the first and second dimming patterns gradually increase. In the first dimming pattern, the length of the emission-side protrusion gradually increases from the end to the center, while in the second dimming pattern, the area thereof gradually increases from the end to the center.

Similarly, also in the dimming pattern 3 on the second stage 131, in order from the end 105, a combination pattern of a first dimming pattern r378 and a second dimming pattern rb379, a combination pattern of a first dimming pattern s380 and a second dimming pattern sb381, a combination pattern of a first dimming pattern t382 and a second dimming pattern tb383, and a combination pattern of a first dimming pattern u384 and a second dimming pattern ub385 are arranged. Also here, as with the above-described case, the shape/size of the first and second dimming patterns gradually increase from the end to the center.

Here, the first dimming pattern has a chestnut shape comprising an elliptic portion, emission-side protrusions, and rear-side protrusions, as Embodiment 1, while the second dimming pattern has an elliptical shape smaller than the first dimming pattern. Then, if the transmittance of a material serving as the base of the first dimming pattern is 50% and the transmittance of a material serving as the base of the second dimming pattern is 70%, the transmittance of a portion where the first dimming pattern and the second dimming pattern are overlapped (a portion where the second dimming pattern is provided) becomes the product of the both transmittances, i.e., 0.5×0.7=0.35 (35%). In this manner, by varying the transmittance of a part of the dimming pattern, the uneven brightness can be more finely corrected. In particular, in the vicinity directly above the LED 2, the brightness significantly increases as compared with other portions, and therefore the second dimming pattern is preferably overlapped with a portion directly above the LED 2 of the first dimming pattern.

Here, the configuration of the dimming pattern in the vicinity of the end on the left side is shown, however, as in the first embodiment, the vicinity of the end on the right side also has the same configuration. Moreover, in the embodiment, as in the first embodiment, the configuration of the dimming pattern 3 is varied between the lowermost stage 130 of the light guide plate 1 and the second stage 131 and the subsequent stages.

In the embodiment, the dimming pattern 3 is formed using materials with two types of transmittances, but not limited thereto, and three or more types of materials may be used.

In the description of the embodiments, as the method of forming the dimming pattern or the light guide pattern provided in the tight guide plate, a method by printing, coating, or the like has been described. However, it is needless to say that other method, such as ink-jet printing, flexo printing, heat-transfer printing, or the pattern formation using an electrostatic adsorption method (the so-called electrophotographic method), the same effect can be obtained.

Moreover, the length of the protrusion in the emission-side protrusion and in the rear-side protrusion, respectively, is the same in one dimming pattern but may differ. For example, the smaller the angle between the optical axis of an LED and the emission-side protrusion, the longer the length of the protrusion may be set, while the larger the angle between the optical axis of the LED and the emission-side protrusion, the shorter the length of the protrusion may be set.

In the description of the embodiments, the LED has been described for the so-called "side view type LED" taken as an example, however, it is needless to say that even a top view type LED (with an upward emission configuration) can be similarly constructed and the same effect can be obtained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An illumination unit, comprising a light emitting element and a tabular light guide plate including a plurality of regions having a light emitting surface for emitting light from the light emitting element as planar light, wherein a recessed portion is formed in an opposite surface of the light emitting surface of the light guide plate and the light emitting element is provided in the recessed portion so that an optical axis of the light emitting element becomes parallel to the light emitting surface of the light guide plate;
   wherein a plurality of the light emitting elements are arranged along a longer direction of the recessed portion,
   wherein a dimming pattern is provided on the light emitting surface of the light guide plate at a location corresponding to each of the plurality of light emitting elements; and
   wherein a shape or a size of the dimming pattern is varied with a location on the light emitting surface of the light guide plate.

2. The illumination unit according to claim 1, herein the light emitting element is an LED.

3. The illumination unit according to claim 1, wherein the dimming pattern is formed by printing.

4. The illumination unit according to claim 1, wherein the size of the dimming pattern in a vicinity of a peripheral portion of a screen is smaller than the dimming pattern in a center of the screen.

5. The illumination unit according to claim 1, wherein the dimming pattern includes a main portion covering the light emitting element on the light emitting surface side, and protrusions radially extending toward light emitting directions of the light emitting element around the light emitting element.

6. The illumination unit according to claim 5, wherein the dimming pattern further includes second protrusions radially extending toward directions on an opposite side of the light emitting side of the light emitting element.

7. The illumination unit according to claim 5, wherein the protrusion and the second protrusion have a tapered shape that narrows with the distance from the light emitting element.

8. The illumination unit according to claim 1, wherein the dimming pattern is formed by overlapping patterns with different shapes or sizes.

9. The illumination unit according to claim 1, wherein the dimming pattern is formed by combining two or more types of dimming patterns with different transmittances.

10. A display apparatus using the illumination unit according to claim 1 as a back light.

* * * * *